United States Patent [19]
van der Schoot

[11] Patent Number: 5,660,264
[45] Date of Patent: Aug. 26, 1997

[54] ENDLESS CONVEYOR HAVING A CONTINUOUSLY MOVING AND AN INTERMITTENTLY MOVING CONVEYOR PART

[75] Inventor: Jelle van der Schoot, AL Aalten, Netherlands

[73] Assignee: FPS Food Processing Systems B.V., Netherlands

[21] Appl. No.: 520,518

[22] Filed: Aug. 29, 1995

[30] Foreign Application Priority Data

Aug. 31, 1994 [NL] Netherlands .......................... 9401413

[51] Int. Cl.$^6$ .................................................. B65G 15/00
[52] U.S. Cl. ........................ 198/594; 198/631.1
[58] Field of Search ......................... 198/347.1, 594, 198/631.1, 343.1

[56] References Cited

U.S. PATENT DOCUMENTS

| | | | |
|---|---|---|---|
| 2,932,376 | 4/1960 | Millington | 198/594 X |
| 4,018,325 | 4/1977 | Rejsa | 198/594 X |
| 4,549,647 | 10/1985 | Cosse | 198/594 X |
| 5,024,645 | 6/1991 | Soubrier et al. | 198/631.1 X |
| 5,314,054 | 5/1994 | Van Laar | 198/347.1 |
| 5,322,154 | 6/1994 | Lenherr | 198/594 X |
| 5,467,862 | 11/1995 | Helmstetter | 198/594 X |

*Primary Examiner*—James R. Bidwell
*Attorney, Agent, or Firm*—Larson and Taylor

[57] ABSTRACT

The invention relates to an endless conveyor following a convex contour for use in cooperation with a discharge/feed conveyor. The endless conveyor comprises a number of article holders, such as grippers, for receiving therein discrete articles, such as fruit or eggs. The endless conveyor includes a first conveyor part, which moves continuously in operation, and a second conveyor part, which moves intermittently in operation. The first conveyor part, at a first conveyor part end thereof, is bounded by a return wheel having a stationary rotary shaft. The return wheel is also rotatably drivable for driving the endless conveyor. The first conveyor is positioned to move substantially tangential to the direction of movement of the discharge conveyor, which is also continuously movable, such that the difference in speed between the discharge/feed conveyor and the first conveyor part is substantially zero.

11 Claims, 3 Drawing Sheets

ENDLESS CONVEYOR HAVING A CONTINUOUSLY MOVING AND AN INTERMITTENTLY MOVING CONVEYOR PART

FIELD OF THE INVENTION

The invention relates to an endless conveyor for use in cooperation with a discharge/feed conveyor, the endless conveyor comprising a first conveyor part, moving continuously in operation, and a second conveyor part, moving intermittently in operation.

BACKGROUND OF THE INVENTION

Such an apparatus is known from FR-A-2 519 614. In the known apparatus, the conveyor is carried over two return wheels bearing-mounted in a slide arranged for reciprocation. A first drive unit engages the continuously moving part, and a second drive unit engages the intermittently moving part. The difference in speed of travel between the two parts is set off by displacement of the slide which bearing-mounts the return wheels. A drawback of the known apparatus is the relatively expensive guidance required for bearing-mounting the slide arranged for reciprocation, while the mass of the slide should in each case be accelerated and decelerated, which results in substantial mass forces. In order to limit the occurring mass forces somewhat, the speed of the conveyor is kept relatively low.

Another drawback of the known apparatus is that two drive units are necessary for realizing the continuous and intermittent motion.

Still another drawback of the known apparatus is that the drive elements engaging the conveyor and forming part of the drive units engage the conveyor over only a very small part of the circumference thereof, since both drive elements engage in a straight path of travel. This causes the risk of slip and at any rate, the conveyor will wear quickly on account of this very local engagement. In EP-A-0 390 241, this latter drawback has been overcome by guiding the conveyor along the circumference of the drive element over a larger arc of an angle; however, this has as a consequence that in a conveyor having return wheels accommodated in a slide capable of reciprocation, additional tensioning wheels have to be employed for keeping the tension on the conveyor. This solution also has the drawback that the chain does not move in an entirely convex contour, but follows a concave part at the location of the drive element. In particular when the conveyor is on its convex side provided with article holders such as grippers, a concave part in the contour causes problems, because the grippers must not collide with each other in the concave part. To prevent such collisions, it is necessary that the distance between the grippers is greater than the distance needed when the conveyor moves in an exclusively convex contour. A greater mutual distance between the grippers adversely affects the capacity of the conveyor.

SUMMARY OF THE INVENTION

The object of the invention is to provide an endless conveyor of the type described in the opening paragraph without the drawbacks mentioned.

According to the invention, an endless conveyor is provided for use in cooperation with a discharge/feed conveyor. The endless conveyor includes a first conveyor part, in operation, moving continuously and a second conveyor part, in operation, moving intermittently. The endless conveyor also has a number of grippers, for receiving therein discrete articles, the articles including eggs and substantially spherical or ellipsoidal shaped fruits. The endless conveyor is driven by a return wheel having a rotary shaft and being rotatably drivable. The first conveyor part, at a first conveyor part end thereof, is bounded by the return wheel. The endless conveyor follows a convex contour, the direction of movement of the first conveyor part being substantially tangential to the direction of movement of the discharge/feed conveyor which, in operation, moves continuously. The difference in speed between the discharge/feed conveyor and the first conveyor part is substantially zero. The advantage of an endless conveyor of such design is that the return wheel is fixedly arranged and is hence not located in a slide capable of reciprocation in an expensive guide. An additional advantage is that the return wheel also serves as a drive element, the return wheel being in mesh with the conveyor through a considerable part of its circumference, so that hardly any or no slip or wear of the conveyor, for instance resulting from the highly local contact of the drive element with the conveyor, is involved. In addition, this is the only drive element that engages the conveyors, which also reduces the wear of the conveyor and also results in a lower cost price.

In accordance with further elaboration of the invention, a second conveyor part end of the first conveyor is bounded by a stationary conveyor-guide element and the two ends of the second conveyor part are bounded by conveyor-guide elements arranged for synchronous reciprocation relative to one another. The stationary conveyor-guide element has the function of a return wheel and can be designed as a wheel. Since the conveyor-guide element is stationary, the bearing of this guide element is simple and not costly. The conveyor-guide elements, arranged for synchronous reciprocation relative to each other, which bound the second conveyor part, add a movement to the continuously moving conveyor because of their reciprocal motion, rendering the resulting movement of the conveyor intermittent relative to the surroundings. If the speed of the reciprocal movement is suitably chosen, it can be provided that the resulting speed of movement of the conveyor relative to the surroundings is zero for some time, enabling articles to be exchanged between the article holders of the endless conveyor in the second conveyor part and another stationary receiving or discharge apparatus.

In accordance with a further elaboration of the invention, the conveyor-guide elements arranged for synchronous reciprocation relative to each other are disposed so as to be pivotable about pivots extending parallel to the rotary shaft of the return wheel. Because the conveyor-guide elements, capable of reciprocation, are each pivotally arranged, the reciprocal movement of the conveyor part can be effected in a simple and economical manner without requiring expensive slide guides or like means. The pivotable conveyor-guide elements can be of a light design, as a result of which the mass to be accelerated and decelerated is small. As a consequence, the occurring mass forces are kept small, allowing the conveyor to be moved at high speed, which results in a great capacity of the conveyor.

In further elaboration of the invention, the pivot of one conveyor-guide element capable of reciprocation coincides with the rotary shaft of the return wheel, and the pivot of the other conveyor-guide element capable of reciprocation coincides with an imaginary center of an arch-shaped contour followed by the endless conveyor when abutting against the stationary conveyor-guide element. With a conveyor of such design it is provided that the length of the contour followed by the conveyor remains equal in each position of the conveyor-guide elements capable of reciprocation. In this manner, no tensioning wheels need to be applied for tensioning the conveyor, which adds to the simplicity of the apparatus and limits the wear of the conveyor.

To prevent the second conveyor part from making not only the reciprocal movement, but also a movement perpendicular to the reciprocal movement, it is particularly favorable if the endless conveyor is characterized by the features of claim 5.

BRIEF DESCRIPTION OF THE DRAWINGS

Further elaborations of the invention are described in the subclaims and will be specified on the basis of four exemplary embodiments, with references to the accompanying drawings. In these drawings:

DETAILED DESCRIPTION OF THE PREFERRED EMBODIMENTS

Figure 1:
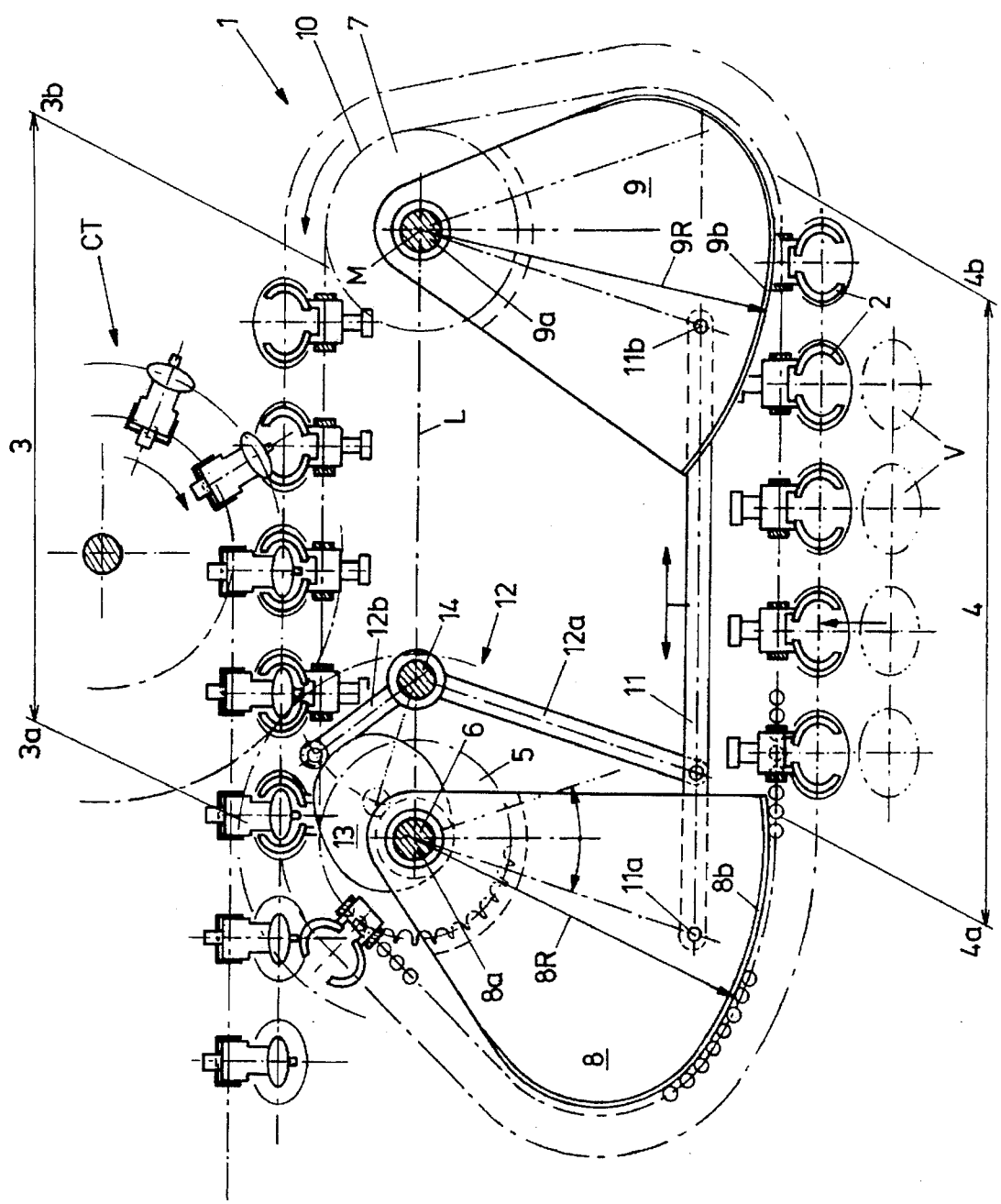
FIG. 1 is a side elevation of the endless conveyor.

The exemplary embodiment shown in FIG. 1 comprises a conveyor 1 having a number of article holders, designed as grippers 2, for receiving therein discrete articles V such as, for instance, fruits or eggs. In operation, a first conveyor part 3 of the conveyor moves continuously and exchanges articles V with a continuously moving feed or discharge conveyor CT. In operation, a second conveyor part 4 moves intermittently and exchanges articles with a feed or discharge apparatus (not shown) by means of which in an upward movement articles are brought into the grippers 2 during the period of the intermittent movement wherein the grippers 2 located in the second conveyor part 4 are stationary.

Adjacent a discharge side of the conveyor 1, the discharge or following conveyor CT extends substantially tangentially to the direction of movement of the conveyor 1 at that location. During use, adjacent the discharge side of the conveyor 1, the difference in speed between the conveyor 1 and the following or discharge conveyor CT is at least substantially 0 m/s.

At a first conveyor part end 3a, the first conveyor part 3 is bounded by a return wheel 5 having a stationary rotary shaft 6. The return wheel 5 is also rotatably drivable for driving the conveyor 1. As is clearly visible in FIG. 1, the endless conveyor can be constructed as a conveyor chain and the return wheel 5 can be a chain wheel that is in mesh with the conveyor chain through a considerable part of its circumference.

At a second conveyor part end 3b, the first conveyor part 3 is bounded by a stationary conveyor-guide element 7. At its two ends 4a, 4b, the second conveyor part 4 is bounded by conveyor-guide elements 8, 9 arranged for synchronous reciprocation relative to each other. The conveyor-guide elements 8, 9 arranged for synchronous reciprocation relative to each other are each pivotable around pivots 8a, 9a, the pivot 8a of one conveyor-guide element 8 capable of reciprocation coinciding with the rotary shaft 6 of the stationary return wheel 5. The pivot 9a of the other conveyor-guide element 9 capable of reciprocation coincides with an imaginary center M of an arc-shaped contour 10 followed by the conveyor 1 when abutting against the stationary conveyor-guide element 7. In the embodiment shown in FIG. 1, the stationary conveyor-guide element 7 is designed as a return wheel 7 arranged for rotation around a stationary shaft. Consequently, in this embodiment, the pivot 9a of the conveyor-guide element 9 coincides with the rotary shaft of the return wheel 7.

At the location of the parts which, in operation, can abut against the second conveyor part 4, the conveyor-guide elements 8, 9 arranged for synchronous reciprocation each have a circular rounded portion 8b, 9b, whose center coincides with the pivot 8a, 9a of the relevant conveyor-guide element 8, 9. The presence of this rounded portion prevents the second conveyor part 4 from moving up and down in vertical direction, which would have a disturbing effect during the exchange of articles between a feed or discharge apparatus, not shown, and the grippers 2 in the second conveyor part 4.

The conveyor-guide elements 8, 9 capable of reciprocation are interconnected by a connecting element 11 having its two outer ends 11a, 11b pivotally connected to one of the conveyor-guide elements 8, 9. The distance between a connecting end 11a, 11b and the pivot 8a, 9a respectively of the conveyor-guide element 8, 9 associated with that connecting end 11a, 11b is equal for the two conveyor-guide elements 8, 9. The distance between the connecting ends 11a, 11b corresponds to the distance between the pivots 8a, 9a of the two conveyor-guide elements 8, 9. Hence, in this manner, a parallellogram is defined by the pivots 8a, 9a and the connecting ends 11a, 11b, which, in order to realize the reciprocal movement of the conveyor-guide elements 8, 9, oscillates around the fixedly disposed corner points 8a, 9a. Such an oscillating parallellogram has the same circumference in every oscillating position, as a consequence of which the conveyor need not be provided with tension rollers for keeping the tension thereof. The absence of the tension rollers adds to the simplicity of the conveyor.

The connecting element 11 also serves as a connecting rod for effecting the reciprocal movement of the conveyor-guide elements 8, 9. For this purpose, the connecting element 11 is pivotally connected to an outer end of a first arm 12a of a lever 12, which lever 12 comprises a second arm 12b which is rigidly connected with the first arm and whose outer end abuts against a rotatable contour cam 13. The lever 12 is pivotable around a shaft 14 lying on the imaginary connecting line L between the pivots 8a, 9a of the conveyor-guide elements 8, 9 capable of reciprocation, and the length of the first lever arm 12a corresponds to the distance between pivot 8a or 9a of a conveyor-guide element 8 or 9 respectively and the connecting end 11a or 11b respectively associated with that element. In the above-described construction, the number of elements involved in effecting the reciprocal movement are minimized and, moreover, these elements can all be of a light design. As a result, the accelerating forces will be low, enabling a high speed of the conveyor so that the conveyor is given a great capacity.

The contour cam 13 is rotatably drivable by a drive mechanism, not shown, which also drives the return wheel 5. Since both the continuous and the intermittent movement with a conveyor of such design are effected through only one drive mechanism, the endless conveyor can be manufactured in an economical manner and, moreover, the maintenance costs of the conveyor are minimized.

Figure 2:
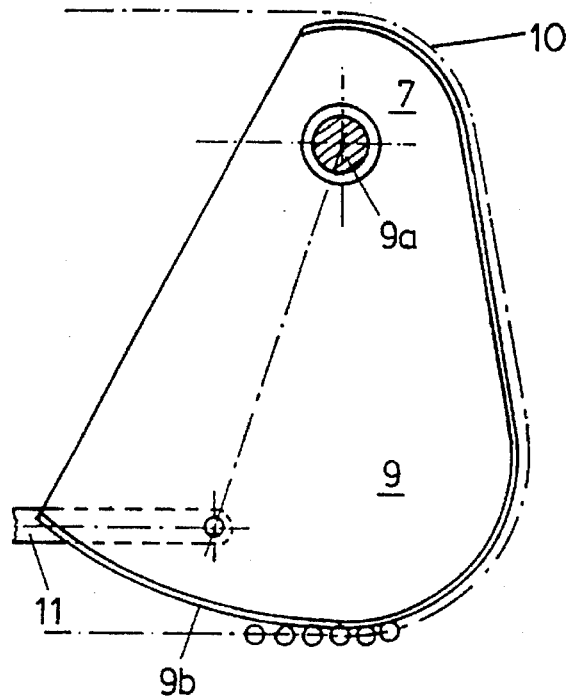
FIGS. 2–4 show the right part of three structural variants of the endless conveyor in similar side elevations as shown in FIG. 1.

In the exemplary embodiment of FIG. 2, the stationary conveyor-guide element 7 is integrated into one of the conveyor-guide elements 9 capable of reciprocation. For this purpose, adjacent pivot 9a, the conveyor-guide element 9 capable of reciprocation comprises a circular rounded portion 9b such that at that location, the conveyor follows a circular contour 10 whose center coincides with the pivot 9a. Such a construction consists of fewer components than the exemplary embodiment shown in FIG. 1 and can therefore be manufactured in an economical manner.

Figure 3:
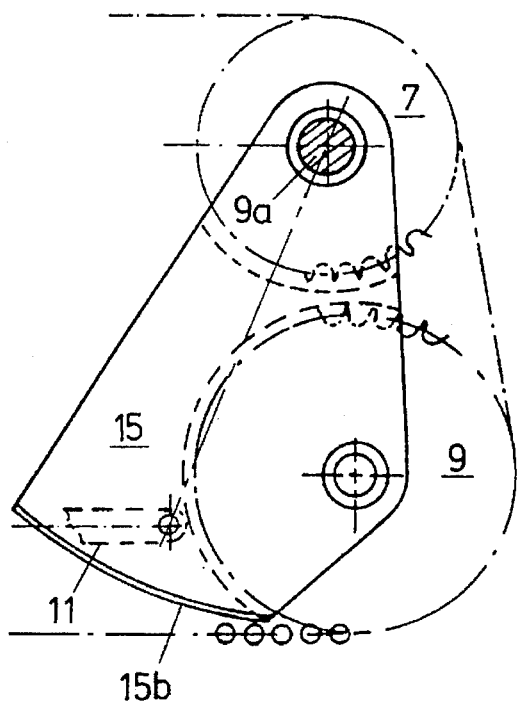
Figure 4:
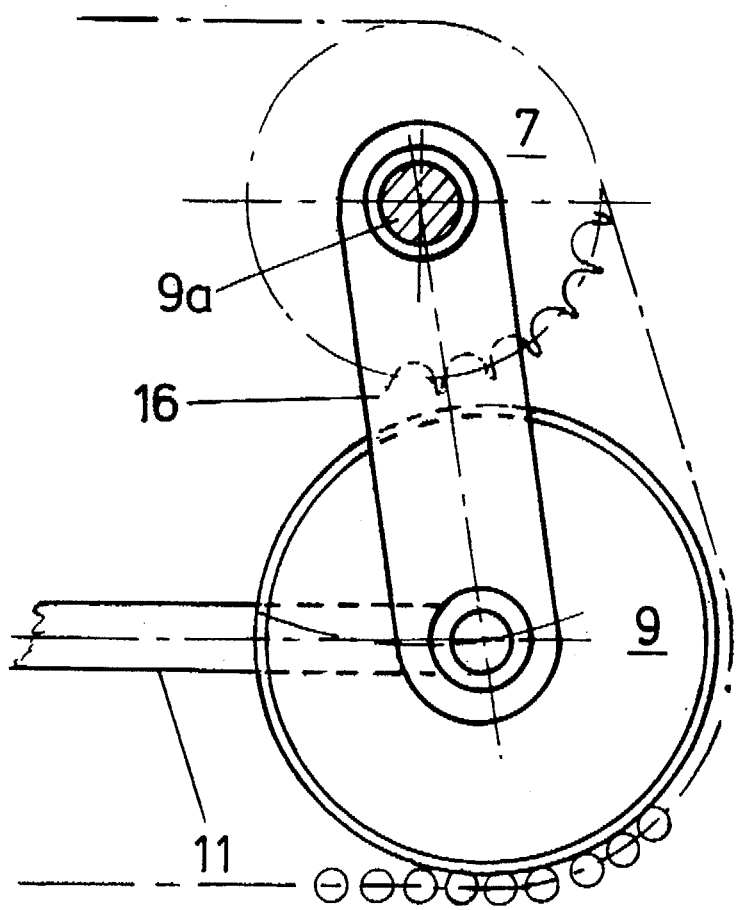

FIGS. 3 and 4 show exemplary embodiments wherein the conveyor-guide elements 8, 9 capable of reciprocation are constructed as freely rotatable return wheels 8, 9. In the exemplary embodiment of FIG. 3, the return wheel 9 shown is bearing-mounted in a guide 15. At the location of parts 15b, which, in operation, can abut against the second conveyor part 4, the guide 15 is provided with a circular rounded portion 15b whose center coincides with the pivot 9a of the associated conveyor-guide elements 9. This rounded portion prevents the second conveyor part 4, in operation, from moving upwards and downwards in vertical direction.

Such a provision has not been made in the exemplary embodiment of FIG. 4, where the return wheel 9 is bearing-mounted in a link rod 16 pivotable around pivot 9a. The connecting rod 11 is pivotally connected to the rotary shaft of the return wheel 9.

It is understood that the invention is not limited to the exemplary embodiments described, but that various modifications are possible within the purview of the invention.

I claim:

1. An endless conveyor for use in cooperation with a discharge/feed conveyor, the endless conveyor comprising:

a first conveyor part, continuously movable in operation;

a second conveyor part, intermittently movable in operation;

a number of grippers, for receiving therein discrete articles selected from the group consisting of eggs, substantially spherical-shaped fruit, and substantially ellipsoidal-shaped fruit; and a return wheel having a rotary shaft and being rotatably drivable for driving the endless conveyor, the first conveyor part being bounded by said return wheel at a first conveyor part end thereof, the endless conveyor following a convex contour, said first conveyor part being positioned to move substantially tangential to the direction of movement of the discharge/feed conveyor, continuously movable in operation, such that difference in speed between the discharge/feed conveyor and the first conveyor part is substantially zero.

2. An endless conveyor according to claim 1 wherein the first conveyor part, at a second conveyor part end thereof, is bounded by a stationary conveyor-guide element, the second conveyor part, at two ends thereof, being bounded by conveyor-guide elements arranged for synchronous reciprocation relative to each other.

3. An endless conveyor according to claim 2 wherein the conveyor-guide elements arranged for synchronous reciprocation relative to each other are each disposed so as to be pivotable around pivots extending parallel to the rotary shaft of the return wheel.

4. An endless conveyor according to claim 3 wherein the pivot of one conveyor-guide element capable of reciprocation coincides with the rotary shaft of the return wheel, the pivot of the other conveyor-guide element capable of reciprocation coinciding with an imaginary center of an arc-shaped contour followed by the endless conveyor when abutting against the stationary conveyor-guide element.

5. An endless conveyor according to claim 4 wherein, at the location of the parts which, in operation, abut against the second conveyor part, the conveyor-guide elements arranged for synchronous reciprocation each have a circular rounded portion whose center coincides with the pivot of the relevant conveyor-guide element.

6. An endless conveyor according to claim 4 further comprising a connecting element pivotally connected, at the two other ends thereof, with one of the conveyor-guide elements capable of reciprocation, the distance between a connecting end and the pivot of the conveyor-guide element associated with said connecting end being equal for the two conveyor-guide elements, the distance between the connecting ends corresponding to the distance between the pivots of the two conveyor-guide elements, with the connecting element also serving as a connecting rod for effecting the reciprocal movement of the conveyor-guide elements.

7. An endless conveyor according to claim 6 wherein the connecting element is pivotally connected to an outer end of a first arm of a lever, said lever comprising a second arm rigidly connected with the first arm and whose outer end abuts against a rotatable contour cam, the lever being pivotable around a shaft lying on an imaginary connecting line between the pivots of the conveyor-guide elements capable of reciprocation, the length of the first arm corresponding to the distance between the pivot of a conveyor-guide element and the connecting end associated with said element.

8. An endless conveyor according to claim 7 wherein the contour cam is rotatably drivable by a drive mechanism which also drives the return wheel.

9. An endless conveyor according to claim 4 wherein the stationary conveyor-guide element is integrated into one of the conveyor-guide elements capable of reciprocation.

10. An endless conveyor according to claim 4 wherein the conveyor-guide elements capable of reciprocation comprise freely rotatable return wheels.

11. An endless conveyor according to claim 10 further comprising guides next to the conveyor-guide elements designed as return wheels at the location of parts that, in operation, can abut against the second conveyor part said guides having a circular rounded portion whose center coincides with the pivot of the associated conveyor-guide element.

* * * * *